United States Patent
Subbiah et al.

(10) Patent No.: US 8,918,217 B2
(45) Date of Patent: Dec. 23, 2014

(54) METHOD AND SYSTEM FOR OPTIMIZING MEMBRANE CLEANING PROCESS

(71) Applicant: ABB Research Ltd, Zürich (CH)

(72) Inventors: Senthilmurugan Subbiah, Tamilnadu (IN); Mekapati Srinivas, Arundelpet (IN); Naveen Bhutani, New Delhi (IN)

(73) Assignee: ABB Research Ltd., Zürich (CH)

(*) Notice: Subject to any disclaimer, the term of this patent is extended or adjusted under 35 U.S.C. 154(b) by 0 days.

(21) Appl. No.: 13/655,021

(22) Filed: Oct. 18, 2012

(65) Prior Publication Data

US 2013/0060384 A1   Mar. 7, 2013

Related U.S. Application Data

(63) Continuation of application No. PCT/IB2010/002472, filed on Sep. 30, 2010.

(30) Foreign Application Priority Data

Apr. 19, 2010   (IN) .......................... 1087/CHE/2010

(51) Int. Cl.
| | | |
|---|---|---|
| G01B 15/02 | (2006.01) | |
| B01D 61/12 | (2006.01) | |
| B01D 65/02 | (2006.01) | |
| C02F 1/44 | (2006.01) | |
| C02F 1/00 | (2006.01) | |

(52) U.S. Cl.
CPC .............. *B01D 61/12* (2013.01); *B01D 65/02* (2013.01); *C02F 1/441* (2013.01); *B01D 2311/12* (2013.01); *B01D 2321/16* (2013.01); *C02F 1/008* (2013.01); *C02F 2209/00* (2013.01); *C02F 2303/16* (2013.01)
USPC ............. 700/271; 700/266; 702/31; 702/32; 422/3; 422/28; 422/105; 422/107; 436/50; 436/55; 436/49

(58) Field of Classification Search
USPC ............. 700/266, 271; 702/31, 32; 422/3, 28, 422/105, 107; 436/50, 55, 49
See application file for complete search history.

(56) References Cited

U.S. PATENT DOCUMENTS

| | | | | |
|---|---|---|---|---|
| 5,536,479 | A | * | 7/1996 | Miller et al. .................. 422/261 |
| 6,161,435 | A | | 12/2000 | Bond et al. |
| 2008/0099399 | A1 | | 5/2008 | Skinner et al. |
| 2010/0193435 | A1 | | 8/2010 | Blankert et al. |
| 2010/0282679 | A1 | | 11/2010 | Langlais |

FOREIGN PATENT DOCUMENTS

| | | |
|---|---|---|
| WO | WO 96/28236 A1 | 9/1996 |
| WO | WO 2008/120978 A2 | 10/2008 |
| WO | WO 2009/083670 A1 | 7/2009 |

OTHER PUBLICATIONS

International Search Report (PCT/ISA/210) issued on Jan. 27, 2011, by the Indian Patent Office as the International Searching Authority for International Application No. PCT/IB2010/002472.

* cited by examiner

*Primary Examiner* — Shogo Sasaki
(74) *Attorney, Agent, or Firm* — Buchanan Ingersoll & Rooney PC

(57) ABSTRACT

A reverse osmosis separation process is disclosed, such as for desalination and waste water reuse process, wherein an effectiveness of membrane cleaning can be estimated. Exemplary embodiments operate the reverse osmosis membrane cleaning process for a controlled time for cleaning and with a controlled value of chemical concentration in a chemical liquor prepared for cleaning the membrane. A method can include estimating fouling status of the membrane and determining a controlled value of chemical concentration in the chemical liquor, and a controlled time for cleaning based on the fouling status of the membrane.

4 Claims, 3 Drawing Sheets

METHOD AND SYSTEM FOR OPTIMIZING MEMBRANE CLEANING PROCESS

RELATED APPLICATION

This application claims priority as a continuation application under 35 U.S.C. §120 to PCT/IB2010/002472, which was filed as an International Application on Sep. 30, 2010 designating the U.S., and which claims priority to India Application 1087/CHE/2010 filed in India on Apr. 19, 2010. The entire contents of these applications are hereby incorporated by reference in their entireties.

FIELD

The present disclosure relates to a reverse osmosis separation process which can be used for desalination and waste water reuse process. For example, a method and system for estimating the effectiveness of the membrane cleaning are disclosed.

BACKGROUND INFORMATION

A reverse osmosis (RO) separation process is becoming increasingly important in the last two decades for desalination and waste water reuse process. An RO process is aimed at replacing known energy inefficient processes such as thermal processes & chemical processes. This was possible after (i) discovering low pressure and high rejection membrane at lower cost; and (ii) integration of an energy recovery device (ERD) for recovering energy from reject stream. Even though membrane separation processes can be more energy efficient than other known processes, the membrane separation can involve membrane fouling (deposition of unwanted material at membrane surface due to concentration polarization), such as the accumulation of solute molecules near the membrane surface. These materials can be either biological or chemical in nature resulting in bio-fouling or chemical fouling, respectively. As a result, a membrane separation process can become inefficient over a period of operation due to the decrease in production flow rate because of continuous fouling at membrane surface.

In general the RO trains are operated at a recommended feed pressure and feed flow rate given by membrane operators, but in real system the optimal operating condition such as feed pressure & flow rate will be changing with respect to the membrane operating condition. To address this issue, a Membrane Performance tool is available to estimate optimal operating conditions for controlling membrane fouling condition.

Although the membranes can be operated at their optimal operating conditions, the fouling at a membrane surface cannot be avoided in the membrane separation process. Therefore the chemical cleaning and membrane replacement are inherent activities for membrane separation processes. Presently the schedule for membrane replacement and chemical cleaning can be suggested by either a membrane expert (consultant) or membrane manufacturers.

In order to reduce membrane fouling in an RO process, the feed water to a membrane can be treated continuously with fouling control chemicals such as antiscalants. Though antiscalants dissolve the substances accumulated near the membrane surface and reduce the rate of fouling, the high dosage of antiscalants can lead to an increase in RO membrane degradation. Therefore, controlled addition of antiscalants can be used for controlled membrane fouling, leading to minimal membrane degradation and lower chemical consumption.

Also membrane cleaning chemicals can be added to clean the membrane at a certain flow rate and concentration as suggested by the membrane manufacturer. Optimizing the chemical flow rate and cleaning cycle based on the current membrane fouling state will reduce the cost of chemicals. This will also help in reducing the production off time due to cleaning, and hence increase the RO permeate production.

The membrane fouling/cleaning is poorly understood due to lack of physical understanding about the interaction between (i) fouling material and membrane, (ii) among fouling materials, (iii) fouling material and cleaning chemicals, and (iv) between membrane and cleaning chemicals. Since the cleaning phenomena is not well understood, an existing practice is to keep a membrane soaked in cleaning chemicals for a fixed period of time and then bring it back to operation.

A current practice of membrane cleaning is based on recommendations from membrane manufacturers which may consume more cleaning chemicals since the recommendations are given based on feed water quality, and are not based on severity of fouling. In addition, these chemicals are also quite costly. Membrane cleaning processes are not well automated and there is an opportunity to develop an advanced tool for estimating effectiveness of the membrane cleaning and optimizing of the cleaning operation.

The membrane cleaning chemistry and its hydrodynamics can be vital in assessing the effectiveness of membrane cleaning. However, it can be very difficult to represent these processes mathematically due to their complex nature. Therefore, a simple alternative method to identify the effectiveness of the membrane cleaning would be helpful.

By estimating the effectiveness of the membrane cleaning, the cleaning chemical consumption and the plant down time can be minimized.

As can be inferred from the above discussion, the membrane cleaning process can be time consuming and not optimal due to excessive use of chemicals. Accordingly, a method and system for optimization of a membrane cleaning process are disclosed.

SUMMARY

A method is disclosed for managing a reverse osmosis membrane cleaning process in a plant performing desalination or waste water reuse by operating a reverse osmosis membrane cleaning process for a controlled time for cleaning and with a controlled value of chemical concentration in a chemical liquor prepared for cleaning the membrane, the method comprising: a) estimating a fouling status of the membrane; and b) determining the controlled value of chemical concentration and the controlled time for cleaning based on the fouling status of the membrane.

A system is disclosed for managing a reverse osmosis membrane cleaning process of a plant performing desalination or waste water treatment by operating the reverse osmosis membrane cleaning process for a controlled time for cleaning and with a controlled value of cleaning chemical concentration in chemical liquor prepared for cleaning the membrane, the system comprising: a. a membrane performance tool to obtain a membrane fouling status; b. at least one sensor to obtain salt concentration information in a chemical liquor to be used for cleaning a membrane; and c. an automation block for administering a concentration of cleaning chemical in the chemical liquor in response to the membrane fouling status and/or the salt concentration information.

BRIEF DESCRIPTION OF THE DRAWINGS

The subject matter disclosed herein will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
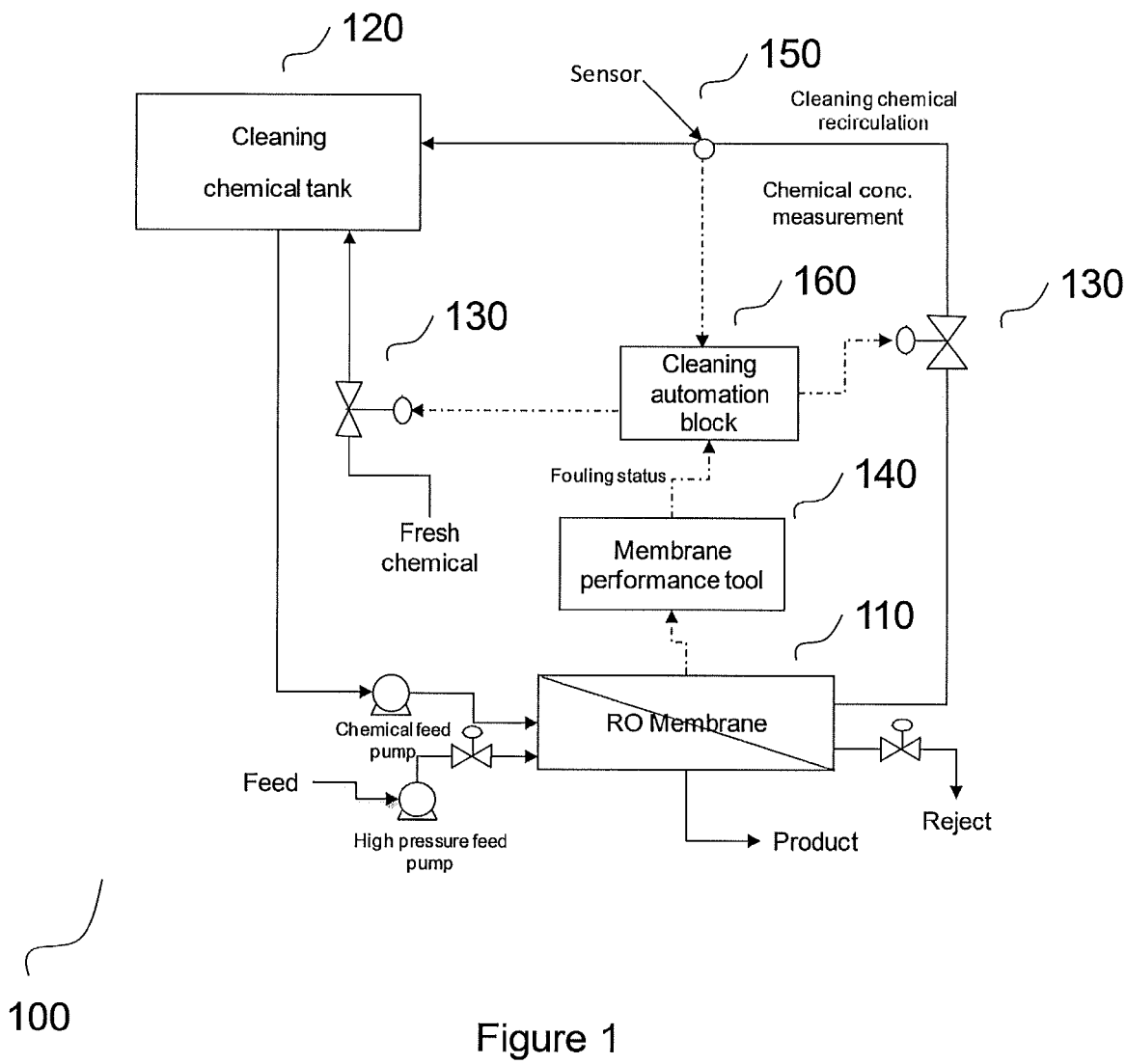
FIG. 1 schematically shows an exemplary RO membrane cleaning system.

A membrane cleaning process is disclosed to provide an automatic solution and to provide cost savings by minimizing plant down time and optimal use of antiscalant cleaning chemicals for membrane cleaning.

An exemplary method for managing a reverse osmosis membrane cleaning process in a plant performing desalination or waste water reuse can include operating the reverse osmosis membrane cleaning process for a controlled time for cleaning and with a controlled value of chemical concentration in a chemical liquor prepared for cleaning the membrane. The method can include:

a) estimate fouling status of the membrane; and b) determine the controlled value of chemical concentration to be included in the chemical liquor and the controlled time needed for cleaning based on the fouling status of the membrane.

The value of chemical concentration and time for cleaning based on the fouling status of the membrane can be determined using optimization techniques for cost effective and efficient operation of the plant.

An exemplary system is disclosed for reverse osmosis managing of a membrane cleaning process in a plant performing desalination or waste water treatment by operating the reverse osmosis membrane cleaning process for a controlled time for cleaning and with a controlled value of cleaning chemical concentration in chemical liquor prepared for cleaning the membrane is provided. The system can include:

a) a membrane performance tool to obtain the membrane fouling status;

b) one or more sensors to obtain salt concentration information in the chemical liquor; and c) an automation block to administer a concentration of cleaning chemical in the chemical liquor.

The membrane performance tool can be based on mathematical or data model, wherein the model utilizes formulations based on physical phenomenon or/and plant parameters including statistical models for computing/estimating membrane fouling status. The membrane performance tool may also be based on direct/indirect measurement techniques (e.g., ultra sound methods to determine fouling status).

In an exemplary variant, in a method for managing a membrane cleaning process, the time for cleaning can be determined using a function for concentration of salts in the chemical liquor that is obtained with Residence Time Distribution studies.

In another exemplary variant, in a system for managing a membrane cleaning process, an automation block used to administer addition of fresh chemical to the chemical liquor has an optimizer to compute an optimal value of chemicals and an optimal time for cleaning.

In yet another exemplary variant, in a system for managing a membrane cleaning process, the automation block can administer addition of fresh chemical to the chemical liquor through one or more control valves controlling the flow of circulated chemical liquor and the flow of fresh chemical into the chemical liquor.

It should be observed that method steps and system components have been represented by known symbols in the figures, showing only specific details that are relevant for an understanding of the present disclosure. In the present disclosure, the method steps are used to distinguish one entity (steps) from another entity, without necessarily implying any specific order among the method steps. Further, details that may be readily apparent to a person ordinarily skilled in the art may not have been disclosed and a mention of a term in singular word form (e.g., cleaning chemical, sensor, etc) are intended to also include plural word forms or the variety generally associated with the term in the art (e.g., variety/plurality of cleaning chemicals, multiple sensors used in measurement, etc).

Embodiments of the present disclosure provide a method and system for estimating effectiveness of membrane cleaning with an estimation block and optimizing of chemical consumption to improve plant down time.

Figure 2:
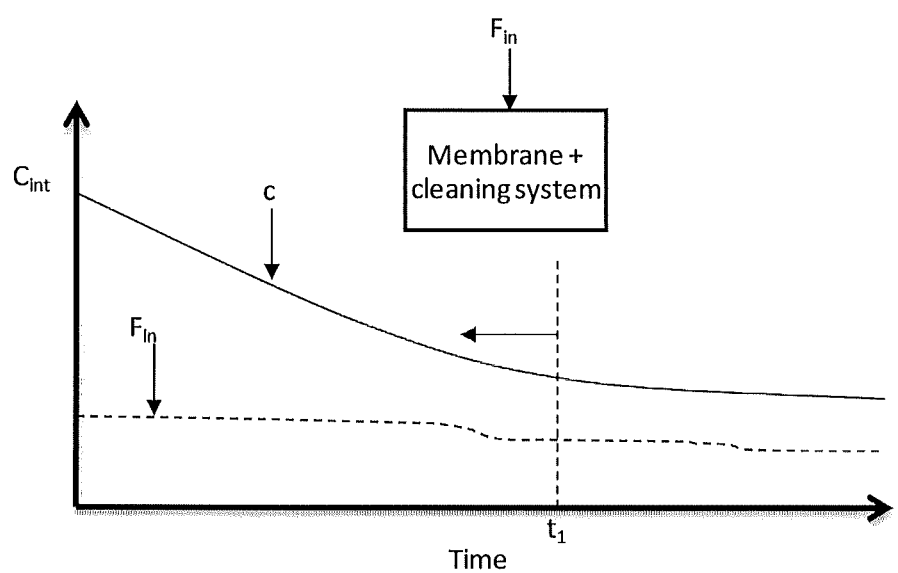
FIG. 2 illustrates exemplary cleaning reaction kinetics.

An exemplary membrane chemical cleaning system 100 is shown in FIG. 2. The membrane chemical cleaning system 100 has a RO membrane 110 that can be cleaned with a cleaning chemical solution and various system components including cleaning chemical tank 120, valves 130, a membrane performance measurement tool 140, one or more sensors 150 to measure chemical concentration, and a cleaning automation block 160 to control the process of cleaning and to manage usage of the cleaning chemical.

The cleaning chemical can be stored in cleaning chemical tank 120 and re-circulated through the fouled RO membrane system 110. During this time there is no regular feed input to the membrane system. The output cleaning chemical from the membrane 110 is again fed to the cleaning chemical tank 120 for recirculation. The concentration of chemical will decrease due to the chemical reaction between cleaning chemical and organic/inorganic salts deposited over the membrane surface.

An exemplary process temporality is represented in FIG. 2. To maintain the cleaning chemical concentration in the cleaning chemical tank, additional fresh cleaning chemical can be added to the system so as maintain a favorable chemical reaction rate. The fresh chemical addition and the chemical recirculation are controlled by the cleaning automation block 160.

The concentration of a cleaning chemical in the membrane cleaning system can be estimated from mass balance and reaction kinetic equations (1-3) as given below:

$$\frac{dV}{dt} = F_{in} \tag{1}$$

$$\frac{dVc}{dt} = F_{in}C_{in} + S_m r_c \tag{2}$$

Kinetic equation for reaction rate=

$$r_c = -k_c c^a \tag{3}$$

The equations for initial conditions are as follows:

$$c = c_{int} \tag{4}$$

$$V = V_{int} \tag{5}$$

Where,
V=Total cleaning chemical volume, m³
$F_{in}$=Inlet cleaning chemical flow rate, m³/s
c=Cleaning chemical concentration at membrane system, kg/m³
$c_{in}$=inlet cleaning chemical concentration, kg/m³
$S_m$=membrane surface area, m²
$r_c$=rate of cleaning chemical reaction, kg/m² s
$k_c$=reaction rate constant, (kg/m² s) (kg/m³)$^{-a}$
a=reaction order, (–)
$c_{int}$=initial concentration of cleaning chemical, kg/m³
$V_{int}$=initial cleaning chemical volume, m³
The fouling state of the membrane can be represented in terms of hydrodynamic permeability (A) and Solute permeability (B). The temporal behavior of fouling in the membrane can be modeled with the following equations:

$$\frac{dx}{dt} = F_{in}(x - x_\infty) + r_c \quad (6)$$

The initial condition is given by $$x(0) = x_0 \quad (7)$$

where,
x=Fouling state of the membrane which could be A and B
$x_\infty$=Irreversibile fouling state of the membrane which cannot be restored by chemical cleaning
$x_0$=Initial fouling state of the membrane which could be obtained from the advanced membrane fouling monitoring solution The membrane performance tool 140 can be based on using an ultra sound sensor to measure fouling, or based on a model for fouling, or any other method that provides fouling status. The model parameters may be one or more fouling parameters including hydrodynamic permeability, solute permeability, reflection coefficient, etc. In addition, the model can use, for example, plant parameters such as feed pressure, reject water flow rate, product water flow rate, product water total dissolved solids for estimating fouling status (extent of fouling). The fouling status is used as an input for determining the optimal chemical usage by the cleaning automation block 160.

The cleaning automation block can include (e.g., consist of) a mathematical model that makes use of measured plant data from the plant control system or other measurement system interfaced with the cleaning automation block to provide directly measured data or data that is estimated based on one or more measured parameters related to the membrane performance or process of chemical cleaning.

In an exemplary embodiment, the extent of fouling in membrane can be estimated using the advanced membrane fouling monitoring solution in the following ways: (i) by estimating the current fouling parameters from membrane model with the use of online plant measurements; and (ii) by comparing the current fouling parameters with those of earlier cleaning cycles to estimate the membrane degradation right from the start of membrane operation. With this information, the approximate dosage for membrane cleaning chemicals is estimated and the fouled membrane can be initially fed with the estimated amount of chemicals.

During the membrane cleaning process, the salts deposited over the membrane are dissolved in re-circulating liquor and its concentration can be measured by using suitable sensors (for example, sensors like an ion selective electrode that measures calcium and sulphate). The model for estimation can rely on data from Residence Time Distribution (RTD) studies performed for chemicals with various concentrations used for cleaning of a membrane and the status of fouling monitored during the studies. The probability distribution functions can thus be obtained through the RTD studies. They can provide the amount of time the cleaning chemical is to be circulated in the membrane chamber for effective cleaning and it is a function of the cleaning chemical concentration in the membrane chamber. The estimate of the time may be based on a suitable descriptive statistical parameter (example 85 percentile value) such as a cleaning chemical concentration.

At the beginning of the process of cleaning, the concentration of the dissolved salts measured at a cleaning chemical recirculation path can be expected to increase in the chemical liquor as a result of chemical interaction with the fouled membrane. The chemical concentration decreases and reaches an asymptotic value at end of the cleaning. The end time can be determined from the RTD data for a particular concentration of chemical and the residue in the membrane (e.g., its fouling status). During the process of cleaning, fresh chemical can be added in multiple steps to the circulating liquor to increase the rate of cleaning reaction and reduce the time taken for cleaning if the chemical is added in a controlled manner. Therefore, it can be desired to optimally balance the addition of fresh chemical and the time for cleaning (down time for the plant) and this function can be carried out by the cleaning automation block 160.

An exemplary goal of optimization is to minimize the cleaning chemical consumption and cleaning duration subjected to constraints, such as a maximum limit on chemical concentration recommended by a membrane supplier.

An exemplary objective function for optimization is:

$$\text{obj} = \min\nolimits_{F_{in}, C_{in}, Q_{tp}, t_2} \{w_1 * (t_1 - t_m) * Q_{\Delta t}/C_p + w_2 * \Sigma_{t_1}{}^{t=02} (F_{in} * t_i * C_c)\} \quad (8)$$

Subjected to constraint $$c_{int} \leq c_{limit} \quad (9)$$

$$c \leq c_{limit} \quad (10)$$

Where,
$t_m$=membrane cleaning time as suggested by membrane manufacture, hr
$Q_{\Delta t}$=permeate production rate in the time ($t_1-t_m$), m³/hr
$C_p$=cost per m³ of permeate water, $
$C_c$=cost per m³ of chemical, $ $$t_1 = t_{at \frac{dc}{dt} \approx 0}$$

i.e., the time at which the cleaning chemical concentration become asymptotic with respect to time and no further reaction occurs between cleaning chemical and scale deposited over the membrane surface.
$w_1, w_2$=weight factor
$C_{limit}$=maximum chemical concentration recommended by membrane supplier (used as constraint).
($t_1-t_m$) is always maintained as a positive number; i.e., absolute number is taken in for the calculations.

The control strategy can be formulated with an objective to achieve desired operation (e.g., specified and/or optimized operation) so as to find, for example, optimal profiles for cleaning chemical flux and its concentration as a function of time, while minimizing the cleaning cost and cleaning time.

Figure 3:
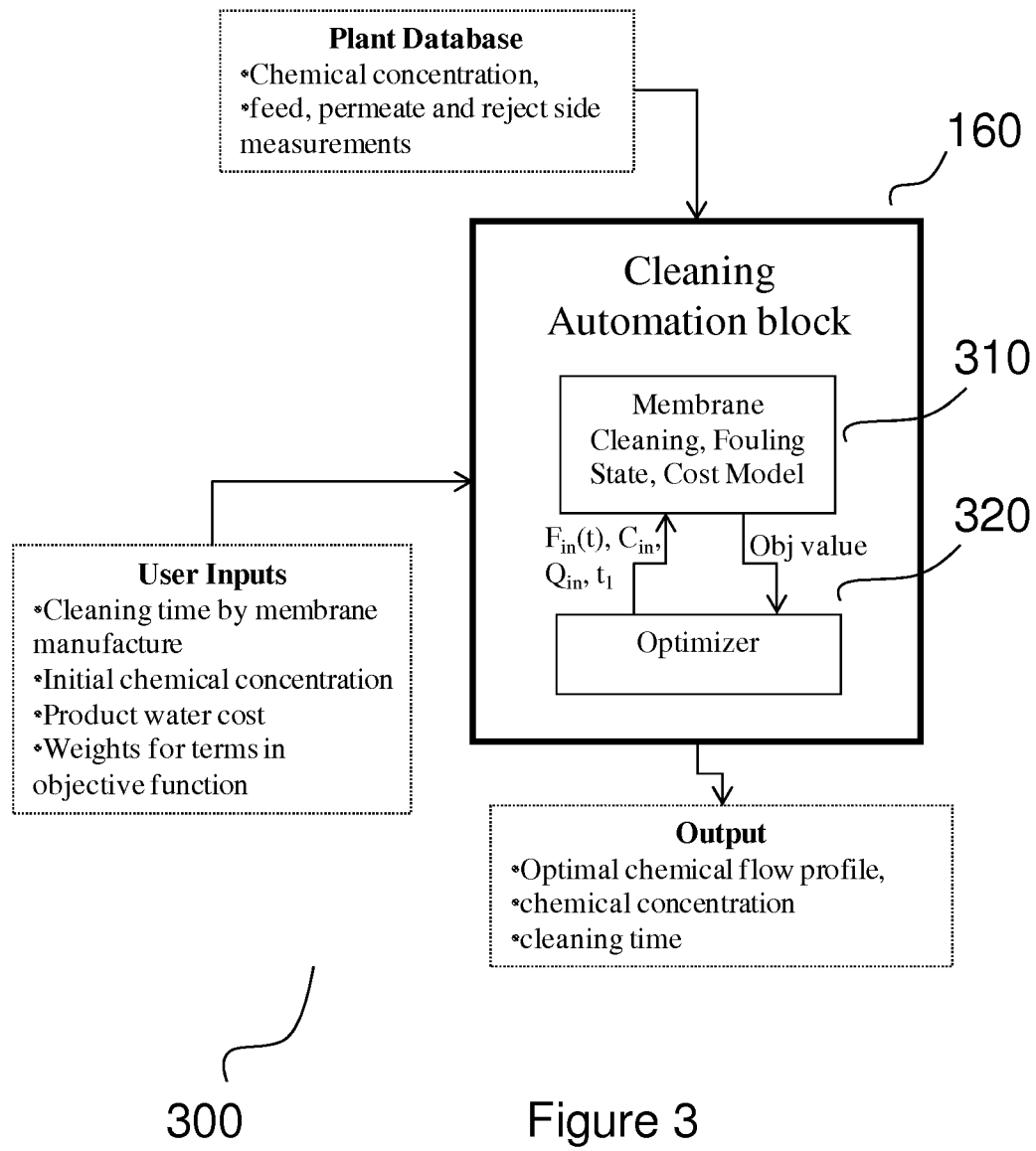
FIG. 3 illustrates an exemplary architecture of a cleaning automation block.

As shown in FIG. 3, the architecture 300 of cleaning automation block 160 can include (e.g., consist of) (i) models for membrane cleaning (RTD model), fouling state, and cost model based on chemical cleaning (310); and (ii) optimizer for minimizing cleaning chemical consumption and cleaning duration (320). The proposed solution methodology can take into account the current fouling state of the membrane (refer eq. 7) obtained from the advanced membrane fouling monitoring solution to come up with an optimal solution for chemical cleaning. The solution may be implemented through flow ratio control for the cleaning chemical liquor controlling the addition of chemical in the liquor based on measurement of salt concentration in the liquor.

The salt concentration data, fouling status data from the components as described herein can be monitored by the membrane cleaning system 100 which can also have information about the cost of chemicals, and cost of plant down time, where the cleaning time and fresh chemical addition can be estimated from the RTD model present with the cleaning automation block 160. The cost information related to chemicals and plant down time can be provided by users and available in the system as illustrated in FIG. 3. With these data, an objective function can be minimized to achieve desired (e.g., specified and/or optimal) values for fresh chemical addition to achieve minimal cleaning time (plant down time). The desired values can be used as a set point in the regulatory control (e.g., ratio control) deployed for the membrane cleaning system 100.

Various other modifications and alterations in the structure and method of operation will be apparent to those skilled in the art without departing from the scope and spirit of the invention. Although the invention has been described in connection with exemplary preferred embodiments and specifically for optimizing usage of chemicals and the time for cleaning for a RO membrane system, it should be understood that the invention as claimed should not be unduly limited to such specific embodiments or to an RO membrane system with components as described herein.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A system for managing a reverse osmosis membrane cleaning process of a membrane of a plant performing desalination or waste water treatment by operating the reverse osmosis membrane cleaning process for a controlled time for cleaning and with a controlled value of cleaning chemical concentration in a circulating chemical liquor prepared for cleaning the membrane, wherein the circulating chemical liquor includes one or more cleaning chemicals, the system comprising:
   a. a processor configured to execute a membrane performance tool that obtains a membrane fouling status of the membrane based on one or more plant parameters;
   b. at least one sensor configured to obtain salt concentration information of one or more dissolved salts in the circulating chemical liquor, wherein one or more dissolved salts are dissolved in the circulating chemical liquor upon cleaning the membrane; and
   c. the processor configured to execute an automation block that receives salt concentration information from the at least one sensor, membrane fouling status from the membrane performance tool of the processor and membrane cleaning costs as inputs and administer a concentration of cleaning chemical in the circulating chemical liquor as a function of membrane cleaning costs and cleaning duration, in response to the membrane fouling status and the salt concentration information based on a residence time distribution model by operating one or more control valves for controlling flow of the circulating liquor and fresh cleaning chemicals.

2. The system for managing a membrane cleaning process as claimed in claim 1, wherein the automation block configured to administer a concentration of cleaning chemical, comprises:
   an optimizer configured to add chemical liquor by computing a desired value of chemicals and a desired time for cleaning.

3. The system for managing a membrane cleaning process as claimed in claim 1, wherein the automation block configured to administer a concentration of cleaning chemical comprises:
   at least one control valve for adding fresh chemical to the chemical liquor and for controlling a flow of circulated chemical liquor.

4. The system for managing a membrane cleaning process as claimed in claim 2, wherein the automation block configured to administer a concentration of cleaning chemical comprises:
   at least one control valve configured to add fresh chemical to the chemical liquor and control a flow of circulated chemical liquor.

* * * * *